No. 727,270. Patented May 5, 1903.

UNITED STATES PATENT OFFICE.

AUGUSTUS BISCHLER, OF BASLE, SWITZERLAND, ASSIGNOR TO THE FIRM OF BASLE CHEMICAL WORKS, OF BASLE, SWITZERLAND.

PROCESS OF MAKING INDOXYL.

SPECIFICATION forming part of Letters Patent No. 727,270, dated May 5, 1903.

Application filed October 25, 1902. Serial No. 128,820. (No specimens.)

*To all whom it may concern:*

Be it known that I, AUGUSTUS BISCHLER, chemist and doctor of philosophy, a subject of the Emperor of Russia, and a resident of Basle, Switzerland, have invented new and useful Improvements in the Manufacture of Indoxyl and its Derivatives, of which the following is a full, clear, and exact specification.

It is known that the yield of indoxyl derivatives obtained by heating phenylglycin derivatives with caustic alkalies or with caustic alkalies and lime is too poor for technical use, because the phenylglycin derivatives are for the greater part decomposed by the high temperature necessary before the indoxyl derivatives are formed.

I have found that the alkali salts of phenylglycin, its homologues and derivatives, such as the alkali salts of phenylglycinorthocarboxylic acid, may be transformed into indoxyl, its homologues and its derivatives, respectively, at a temperature at which the phenylglycin and its derivatives are practically not decomposed by heating them for a period not too prolonged with anhydrous sodium oxid and a diluent or flux—such as caustic potash, caustic soda, or mixtures thereof.

The anhydrous sodium oxid has a more powerful dehydrating action than that of the alkalies, so that the condensation proceeds at a lower temperature.

Example I: Ten kilos of the sodium or potassium salt of phenylglycin and twenty kilos anhydrous caustic potash are heated as much as possible with exclusion of air to about 200° centigrade, and then seven kilos sodium oxid are added while stirring. As soon as the condensation is accomplished, which may be determined by means of tests taken out from the melted mass, leave the mass to cool, dissolve it in water, and precipitate (by introducing a current of air) the indigo resulting from the formed indoxyl.

Example II: Ten kilos of the disodium or dipotassium salt of phenylglycin carboxylic acid are heated with 15 kilos anhydrous caustic potash to about 190° centigrade. Then five kilograms sodium oxid are gradually added to the melted mass while stirring. After the mass has been further heated during half an hour it is dissolved in water, and the indoxyl or indoxyl carboxylic acid contained in the solution is precipitated by introducing air in the said solution.

In the foregoing examples the anhydrous sodium oxid, the alkali, and the salt of phenylglycin or of phenylglycin carboxylic acid may at first be pulverized together and the mixture then heated slowly to the required temperature.

It will be seen from the foregoing that my invention for the production of indoxylic bodies includes in its scope the homologues and derivatives of phenylglycin, and I wish it understood that I do not limit myself to the employment of the alkali salts of phenylglycin itself in carrying out the invention.

What I claim is—

The herein-described manufacture of an indoxylic body by heating an alkali salt of a phenylglycin substance with caustic alkalies and sodium oxid.

In witness whereof I have hereunto signed my name in the presence of two subscribing witnesses.

AUGUSTUS BISCHLER.

Witnesses:
AMAND RITTER,
ALBERT GRAETER.